United States Patent
Roux et al.

(10) Patent No.: US 10,614,559 B2
(45) Date of Patent: Apr. 7, 2020

(54) METHOD FOR DECAMOUFLAGING AN OBJECT

(71) Applicant: SAFRAN ELECTRONICS & DEFENSE, Boulogne Billancourt (FR)

(72) Inventors: Nicolas Roux, Boulogne Billancourt (FR); Philippe Foubert, Boulogne Billancourt (FR); Thierry Touati, Boulogne Billancourt (FR); Marc Bousquet, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 15/772,657

(22) PCT Filed: Nov. 10, 2016

(86) PCT No.: PCT/EP2016/077209
§ 371 (c)(1),
(2) Date: May 1, 2018

(87) PCT Pub. No.: WO2017/081121
PCT Pub. Date: May 18, 2017

(65) Prior Publication Data
US 2018/0322620 A1 Nov. 8, 2018

(30) Foreign Application Priority Data

Nov. 12, 2015 (FR) ..................................... 15 60826

(51) Int. Cl.
*G06T 5/00* (2006.01)
*G06T 5/50* (2006.01)

(52) U.S. Cl.
CPC ................ *G06T 5/007* (2013.01); *G06T 5/50* (2013.01); *G06T 2207/10024* (2013.01); *G06T 2207/10048* (2013.01); *G06T 2207/20212* (2013.01)

(58) Field of Classification Search
CPC . G06T 5/007; G06T 5/50; G06T 2207/20212; G06T 2207/10048; G06T 2207/10024
See application file for complete search history.

(56) References Cited

U.S. PATENT DOCUMENTS 6,356,646 B1  3/2002  Spencer
8,442,339 B2 *  5/2013  Martin ............... G06K 9/00604
                                            382/107

(Continued)

FOREIGN PATENT DOCUMENTS

FR   2 982 393 A1   5/2013
FR   3 011 663 A1   4/2015

OTHER PUBLICATIONS

Dec. 8, 2016 Search Report issued in International Patent Application No. PCT/EP2016/077209.

*Primary Examiner* — Xuemei G Chen
(74) *Attorney, Agent, or Firm* — Oliff PLC; R. Brian Drozd

(57) ABSTRACT

A decamouflaging method includes: obtaining image representing a scene including a multispectral image including components in the spectral domain ranging from the visible domain to the short-wavelength infrared and a thermal image including a component in the medium infrared and/or the long-wavelength infrared; extracting a sub-part ("window") from each of the images obtained at a given position; applying a contrast accentuation procedure to the window extracted from the multispectral image allowing an improved window to be obtained where contrast between pixels corresponding to the object and pixels not corre- (Continued)

sponding to the object is accentuated; forming a multicomponent window, the improved window obtained and the window extracted from the thermal image each supplying a component of the multicomponent window; and applying the procedure to the multicomponent window; generating an image by inserting the improved window obtained by applying the procedure to the multicomponent window in a receiving image representing the scene.

12 Claims, 5 Drawing Sheets

(56) References Cited

U.S. PATENT DOCUMENTS

| | | | |
|---|---|---|---|
| 9,224,192 B2* | 12/2015 | Vajen | G06T 5/002 |
| 9,367,219 B2* | 6/2016 | Andersson | G06F 3/0488 |
| 9,509,924 B2* | 11/2016 | Terre | H04N 5/2251 |
| 9,524,564 B2* | 12/2016 | Agostini | G06T 5/50 |
| 9,723,230 B2* | 8/2017 | Menon | H04N 5/332 |
| 9,922,407 B2* | 3/2018 | Bousquet | G06K 9/0063 |
| 10,089,536 B2* | 10/2018 | Bousquet | G06K 9/0063 |
| 10,116,851 B2* | 10/2018 | Bezot | H04N 5/2258 |
| 2014/0240477 A1 | 8/2014 | Feng et al. | |
| 2014/0253735 A1* | 9/2014 | Fox | H04N 5/2252 |
| | | | 348/164 |
| 2014/0321753 A1* | 10/2014 | Roux | G06K 9/0063 |
| | | | 382/191 |
| 2015/0230875 A1 | 8/2015 | Shademan et al. | |
| 2015/0323388 A1* | 11/2015 | Kostic | A61G 13/10 |
| | | | 250/338.1 |
| 2016/0275698 A1 | 9/2016 | Agostini et al. | |
| 2017/0287190 A1* | 10/2017 | Lin | G06T 5/50 |

\* cited by examiner

METHOD FOR DECAMOUFLAGING AN OBJECT

The invention relates to a method for decamouflaging an object in a scene observed by a plurality of devices comprising a multispectral-image acquisition device and a thermal-image acquisition device, and a device implementing said method.

One method used from time immemorial for carrying out surveillance consists of allocating an observation role to a human being. The human being then uses his visual system and his auditory system for detecting objects or persons. The surveillance methods using the human visual system may be inadequate when the objects or persons to be detected merge in their environment, using, for example, camouflage techniques. Objects or human beings thus camouflaged then become stealthy with regard to the human visual system, that is to say they are invisible or difficult to see for a human eye.

The past few years have seen the appearance of surveillance systems based on various devices able to capture information able to reveal the presence of an object or human being. These devices comprise image-acquisition devices functioning in various spectral bands ranging from the visible domain to the infrared domain. These spectral bands are situated in particular:

- in the visible domain (VIS) comprising wavelengths ranging from 0.38 to 0.78 micrometres ($\mu$m),
- in the near infrared (NIR) (0.78 to 1 $\mu$m),
- in the short-wavelength infrared (SWIR) (1 to 2.5 $\mu$m),
- in the medium-wavelength infrared (MWIR) or medium infrared (2.5 to 5 $\mu$m),
- in the long-wavelength infrared (LWIR) (5 to 14 $\mu$m).

Image acquisition devices functioning in the visible domain, such as ODM (optical direct method) and CDM (colour daylight method) image acquisition devices, supply images, referred to respectively as ODM images and CDM images, close to what a human being would see. It will then easily be understood that the ODM and CDM image acquisition devices provide no or little relevant information on an object present in a scene when this object merges in its own environment.

It is known that some objects that are almost invisible in the visible domain appear more distinctly in certain infrared domains. It is then usual to couple the image acquisition devices functioning in the visible domain with infrared image acquisition devices. It is also possible to use image acquisition devices covering a larger range of wavelengths (or spectral band) comprising a plurality of spectral bands situated in the visible domain and/or the infrared domain. This type of image acquisition device, referred to as MSI image acquisition devices hereinafter, is able to capture multispectral images (MSIs), comprising a plurality of components, each component corresponding to a spectral band acquired by the MSI image acquisition device.

Among the image acquisition devices functioning in the infrared, image acquisition devices are known functioning in the infrared at medium wavelengths and/or long wavelengths (referred to indifferently as thermal or THM (THermal Method) image acquisition devices hereinafter) able to capture a thermal signature of an object or of a human being. Thermal image acquisition devices suffer from certain limitations in a context of surveillance on the ground. This is because, when a zone under surveillance is situated on the ground, thermal image acquisition devices may be sensitive to thermal clutter effects caused by hot objects not corresponding to objects sought, such as for example stones heated by the sun. This sensitivity to thermal clutter may then cause false alarms. Moreover, because of the thermal clutter, an object sought may be embedded in very noisy information. In addition, it is known that thermal image acquisition devices are ineffective in detecting static objects situated on the ground during the day.

Although improvements to images issuing from CDM, ODM, MSI and thermal image acquisition devices (referred to respectively as CDM, ODM, MSI and thermal (i.e. THM) images hereinafter) are possible by means of image processing methods, these improvements are generally judged to be unsatisfactory. Thus it is possible to improve MSI or CDM images by image processing methods accentuating contrasts in said images. However, these methods, which we term contrast accentuation methods hereinafter, are relatively effective for showing a silhouette of an object or human being but do not allow to show details internal to said silhouette. However, it may be advantageous to obtain details internal to the silhouette of an object in order to better identify said object.

It should be noted that, although noisy, a thermal image can provide interesting information relating to details internal to the silhouette of an object.

Moreover, it is also known that a combination or an alternating display of information coming from CDM, ODM, MSI and thermal images is also not satisfactory.

It is desirable to overcome these drawbacks of the prior art.

It is in particular desirable to propose a method and device allowing effective decamouflaging of an object or human being in a scene. It is also desirable for said method and device to facilitate identification of said object or human being. In other words, it is desirable for said method and device to be able to provide, for example to an operator responsible for watching a scene, an image comprising a silhouette of an object sought and details of said object in the silhouette.

According to a first aspect of the present invention, the present invention relates to a method for decamouflaging an object in a scene observed by a plurality of devices comprising a device for acquiring images, referred to as multispectral images, comprising a plurality of components, each representing a spectral band lying in a visible and/or near infrared and/or short-wavelength infrared domain, and a device for acquiring images, referred to as thermal images, comprising at least one component representing a spectral band lying in the medium infrared and/or the long-wavelength infrared. The method comprises: obtaining a multispectral image and a thermal image, each component of the multispectral image and each component of the thermal image being harmonised spatially and temporally with each other; obtaining at least one position of a subpart of an image, referred to as a window, and, for each position obtained: extracting a window from each of the multispectral and thermal images at said position; applying a contrast accentuation procedure to at least one of the extracted windows comprising a window extracted from the multispectral image, said procedure, when it is applied to a window, allowing to obtain a window, referred to as an improved window, in which a contrast between pixels corresponding to the object and pixels not corresponding to the object is accentuated; forming a multicomponent window, each improved window obtained and each extracted window to which said procedure has not been applied providing at least one component of the multicomponent window; and applying said procedure to the multicomponent window; generating an image, referred to as a restitution image, by inserting each improved window obtained by applying said procedure to each multicomponent window formed in a receiving image representing the scene.

Said method, by virtue of the coupling between information issuing from multispectral images and information issuing from thermal images, allows to supply, to an operator responsible for surveillance of a scene, an image comprising a silhouette of the object sought and details of said object in the silhouette. Display of the object and of the details thereof is improved thereby.

In one embodiment, the contrast accentuation procedure comprises, when it is applied to a window: obtaining at least one position of a first mask suitable for containing pixels corresponding to said object in said window and, for each position: positioning said mask at said position in said window; defining a second mask comprising pixels of said window not included in the first mask, and applying a Fisher projection to the pixels of said window in order to obtain an improved window in which contrast between the pixels of the first and second mask is accentuated.

In one embodiment, the first mask is suitable for each pixel of the object to be contained in said first mask.

In one embodiment, the first mask is suitable for containing each pixel of a detail of said object having an interest for identifying said object.

In one embodiment, the method comprises, for the window extracted from the multispectral image and the window extracted from the thermal image: applying the contrast accentuation procedure for a plurality of positions of the first mask in each of said windows, the plurality of positions allowing to cover the object entirely; forming a first unique improved window from each improved window obtained during each application of the contrast accentuation procedure to the window extracted from the multispectral image and a second unique improved window from each improved window obtained during each application of the contrast accentuation procedure to the window extracted from the thermal image; and forming the multicomponent window from the first and second unique improved window.

In one embodiment, the method comprises, for the multicomponent window formed: applying the contrast accentuation procedure for a plurality of positions of the first mask in the multicomponent window, the plurality of positions allowing to cover the object entirely; forming a third unique improved window from each improved window obtained during each application of the contrast accentuation procedure to the multicomponent window; using the third unique improved window for generating the restitution image.

In one embodiment, the plurality of components of the multispectral image comprises at least one spectral band included in the visible domain corresponding to a red and/or blue and/or green primary colour and, for each position of said window obtained, the method comprises: applying the contrast accentuation procedure to the window extracted from the multispectral image, each component corresponding to a spectral band situated in the near infrared and/or short-wavelength infrared not being taken into account; calculating a contrast value, referred to as the visible contrast value, between the pixels corresponding to the first mask and the pixels corresponding to the second mask of the improved window obtained following the application of the contrast accentuation procedure; and ending the implementation of the method for decamouflaging an object for the position of said window obtained when said visible contrast value is above a predefined threshold, referred to as the visible threshold.

In one embodiment, the thermal image comprises at least two components and, for each position of said window obtained, the method comprises: applying the contrast accentuation procedure to the window extracted from the thermal image; calculating a contrast value, referred to as the thermal contrast value, between the pixels corresponding to the first mask and the pixels corresponding to the second mask of the improved window obtained following the application of the contrast accentuation procedure to the window extracted from the thermal image; and ending the implementation of the method for decamouflaging an object for the position of said window obtained when the thermal contrast value is above a predefined threshold, referred to as the thermal threshold.

In one embodiment, the multispectral images represent spectral bands situated in a spectral band ranging from 0.4 to 1 µm or 0.6 to 1 µm or 0.9 to 2.5 µm and the thermal images represent a spectral band situated between 3 and 5 µm or between 8 and 12 µm.

According to a second aspect of the present invention, the present invention relates to a device for decamouflaging an object in a scene observed by a plurality of devices comprising a device for acquiring images, referred to as multispectral images, comprising a plurality of components, each representing a spectral band lying in a visible and/or near infrared and/or short-wavelength infrared domain, and a device for acquiring images, referred to as thermal images, comprising at least one component representing a spectral band lying in the medium infrared and/or the long-wavelength infrared. The device comprises: obtaining means for obtaining a multispectral image and a thermal image, each component of the multispectral image and each component of the thermal image being harmonised spatially and temporally with each other; obtaining means for obtaining at least one position of a subpart of an image, referred to as a window, and, for each position obtained: extraction means for extracting a window from each of the multispectral and thermal images at said position; application means for applying a contrast accentuation procedure to at least one of the extracted windows comprising a window extracted from the multispectral image, said procedure, when it is applied to a window, allowing to obtain a window, referred to as an improved window, in which a contrast between pixels corresponding to the object and pixels not corresponding to the object is accentuated; formation means for forming a multicomponent window, each improved window obtained and each extracted window to which said procedure has not been applied providing at least one component of the multicomponent window; and application means for applying said procedure to the multicomponent window; generation means for generating an image by inserting each improved window obtained by applying said procedure to each multicomponent window formed in a receiving image representing the scene.

According to a third aspect of the invention, the invention relates to a computer program comprising instructions for the implementation, by a device, of the method according to the first aspect, when said program is executed by a processor of said device.

According to a fourth aspect of the invention, the invention relates to storage means storing a computer program comprising instructions for the implementation, by a device, of the method according to the first aspect, when said program is executed by a processor of said device.

The features of the invention mentioned above, as well as others, will emerge more clearly from a reading of the following description of an example embodiment, said description being given in relation to the accompanying drawings, among which:

The invention is described hereinafter in a context of a display system comprising a housing integrating an MSI image acquisition device, a thermal image acquisition device, a processing module and an image display device such as a screen. The invention also applies in a broader context. The invention applies in particular when the MSI image acquisition device, the thermal image acquisition device, the image display device and the processing module of the display system are separate and distant elements, each device being able to be fixed or mobile and manipulated by different operators.

Moreover, it should be noted that a human being appearing in an image is considered to be an object.

Figure 1:
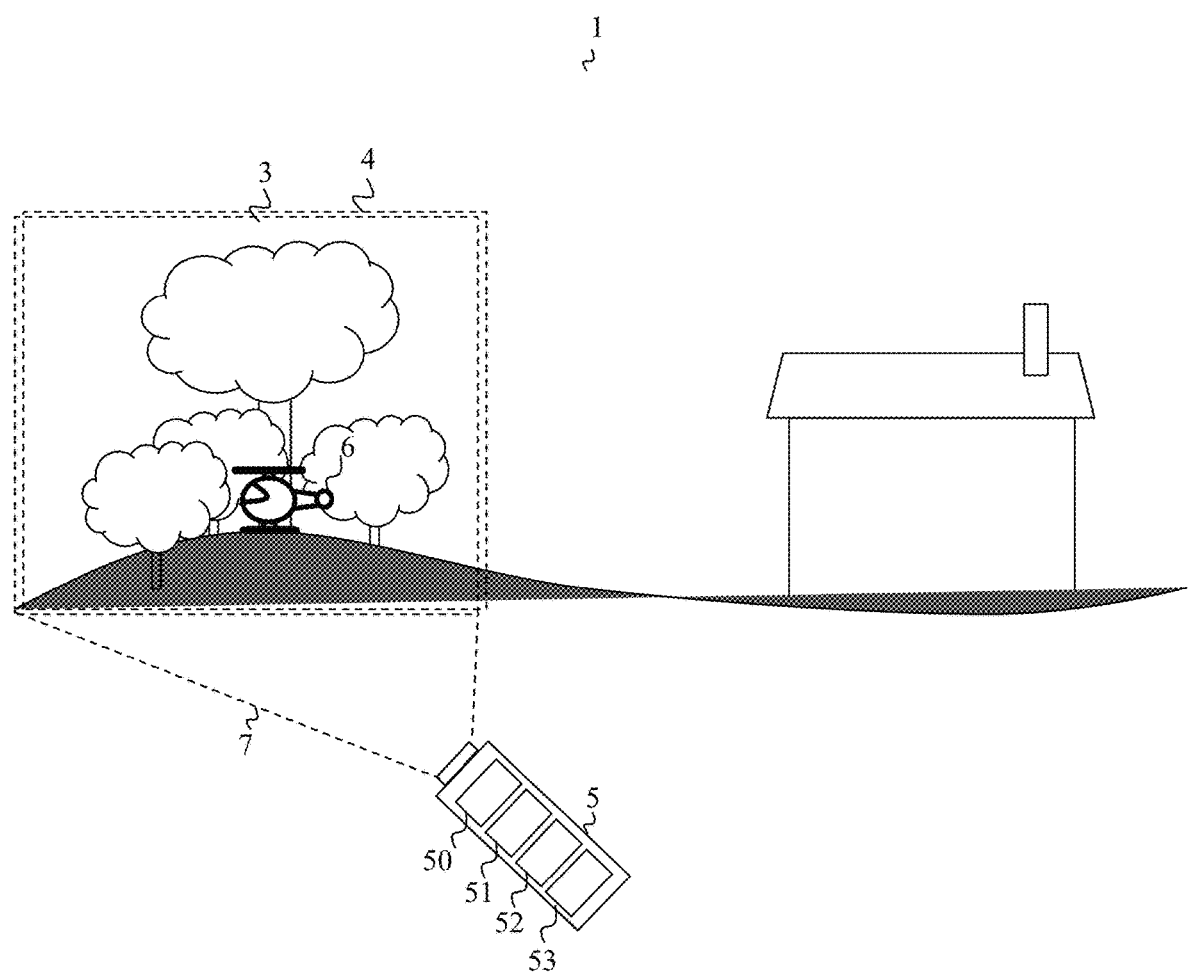
FIG. 1 illustrates schematically an example of context in which the invention can be implemented.

FIG. 1 illustrates schematically an example of context in which the invention can be implemented. An operator (not shown) observes a scene 1 comprising a sought object 6 (here a helicopter camouflaged under branches) using a display system 5. The display system 5 comprises a thermal image acquisition device 50, an MSI acquisition device 51, a processing module 52 and an image display device 53. The thermal image acquisition device 50 is for example of the video acquisition system type and allows to acquire a sequence of thermal images 3 representing an optical field 7 with a first image frequency. The MSI image acquisition device 51 is for example of the video acquisition system type and allows to acquire a sequence of MSI images 4 representing the same optical field 7 with the same image frequency. In one embodiment, the first and second image frequencies are equal to one another and equal to 25 to 30 images per second. Each MSI image 4 supplied by the image acquisition device 51 is a multispectral image, the characteristics of which are detailed in relation to FIG. 3. We detail the MSI image acquisition device 51 in relation to FIG. 2A.

Figure 4:
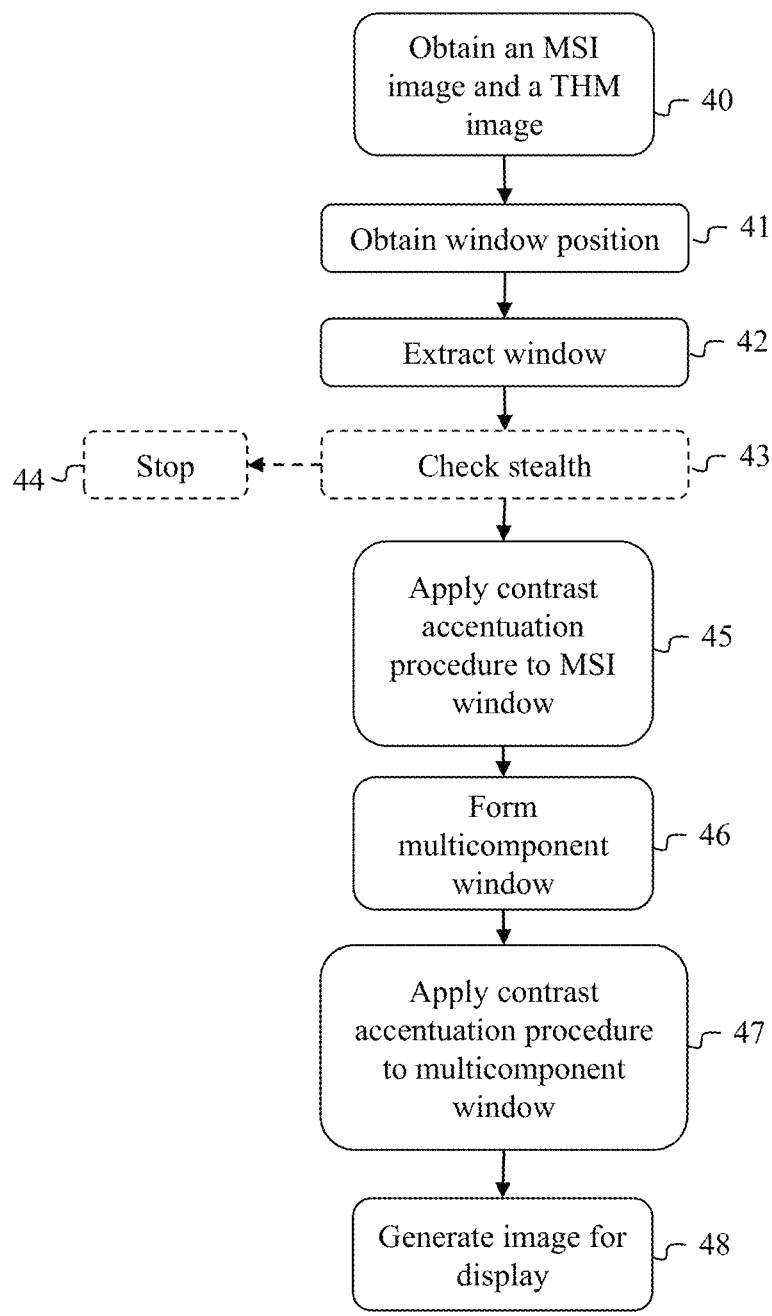
FIG. 4 illustrates schematically a method for decamouflaging an object in a scene according to the invention.

The processing module 52 receives thermal images 3 and MSI images 4 respectively from the thermal image acquisition device 50 and from the MSI image acquisition device 51 and applies thereto processing that we describe in relation to FIG. 4. We detail the processing module 52 in relation to FIG. 2B. From a pair of images comprising a thermal image 3 and an MSI image 4, the processing module 52 produces an image, referred to as the restitution image, in which the object sought 6 is identifiable and supplies this image to the image display device 53, which displays it. The image display device 53 is for example a screen or an eyepiece of the display system 5.

In one embodiment, the first image frequency is lower than the second image frequency. For example, the first image frequency is equal to 15 images per second and the second image frequency is equal to 30 images per second.

Figure 2A:
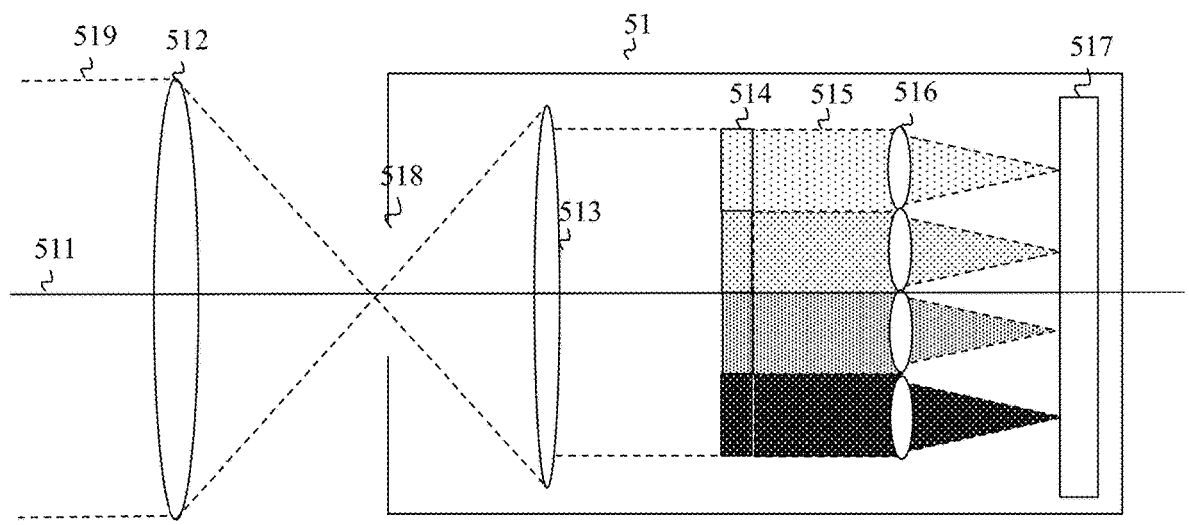
FIG. 2A illustrates schematically an example of an MSI image acquisition device included in a display system.

FIG. 2A illustrates schematically an example of an MSI image acquisition device included in a display system.

The MSI image acquisition device 51 receives a light beam 519 that it redirects to an image sensor 517 in order to create a sequence of multispectral images 4. To do this the image acquisition device 51 comprises a primary lens 512, a field diaphragm 518, a secondary lens 513, a matrix of filters 514 and a matrix of mini-lenses 516. The primary lens 512, the field diaphragm 518, the secondary lens 513, the matrix of filters 514, the matrix of mini-lenses 516 and the image sensor 517 are perpendicular to an optical axis 511. The assembly consisting of primary lens 512, diaphragm 518 and secondary lens 513 generates a collimated light beam from the light beam 519. The light beam 519 represents the optical field 7 having a small angle of around 2.5° equally distributed around the optical axis 511. In the example in FIG. 2A, there exists a focal ratio of 2 between the primary lens 512 and the secondary lens 513 so as to obtain a magnification by two of the information coming from the optical field 519. The collimated light beam is received by the matrix of filters 514. The matrix of filters 514 is composed of a plurality of filters decomposing the light beam 519 into a plurality of spectral bands. For example, the matrix of filters 514 comprises six filters able to decompose the light beam into six spectral bands. Each of the six spectral bands is situated in the visible domain and/or in the near infrared domain and/or in the short-wavelength infrared. For example, the six spectral bands are situated in a spectral band ranging from 0.4 to 1 µm or 0.6 to 1 µm or 0.9 to 2.5 µm. In one embodiment, three of the six spectral bands are situated in the visible domain so as to capture the three primary colours red, green and blue, the other spectral bands being situated in the near infrared and/or the short-wavelength infrared. A plurality of light sub-beams 515 are then generated at the output of the matrix of filters 514, each corresponding to one of the spectral bands in the plurality of spectral bands. In the example described in relation to FIG. 2A, six spectral bands are generated. Each light sub-beam in the plurality of light sub-beams 515 is then directed to a zone of the image sensor 517 by a mini-lens in the matrix of mini-lenses 516. The matrix of mini-lenses 516 therefore comprises as many mini-lenses as there are spectral bands generated by the matrix of filters 514 (i.e. six mini-lenses). The image sensor 517 is for example a CCD (charge-coupled device) sensor or a CMOS (complementary metal-oxide-semiconductor) sensor comprising a matrix of photosites able to transform incident light photons into an electrical signal. Sampling of the electrical signal at the second image frequency allows to form one pixel for each photosite. In one embodiment, the image sensor 517 is a matrix of (3×500)×(2×500) photosites able to produce images comprising (3×500)×(2×500) pixels. The image issuing from the image sensor 517 is a so-called single-component image having one component, i.e. each pixel of the image has one component.

Figure 3:
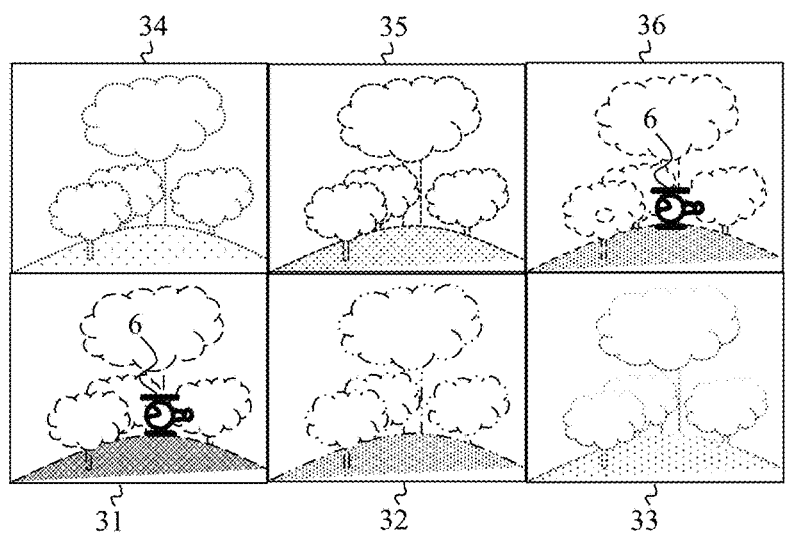
FIG. 3 illustrates schematically an example of a single-component image produced by an image sensor of the MSI image acquisition device.

FIG. 3 illustrates schematically an example of a single-component image produced by an image sensor 517 of the MSI image acquisition device 51.

The single-component image takes the form of a matrix of thumbnails 31 to 36. Each thumbnail results from a focusing, on the image sensor 517, by a mini-lens in the matrix of mini-lenses 516, of a light sub-beam in the plurality of sub-beams 515 supplied by the matrix of filters 514. Each thumbnail 31 to 36 therefore corresponds to a spectral band in the plurality of spectral bands and represents the optical field 7. According to the properties of the object sought 6, the object sought 6 may be visible in zero to six spectral bands, that is to say in zero to six thumbnails 31 to 36. In the example described in relation to FIG. 3, the object sought 6 is visible in the thumbnail 31 and the thumbnail 36. On the other hand, the object sought 6 is scarcely visible or even invisible in the thumbnails 32, 33, 34 and 35. The matrix of thumbnails comprises three columns of two thumbnails of size 500×500 pixels.

In one embodiment, the MSI acquisition device 51 comprises a processing unit recovering the single-component image captured by the image sensor 517 and transforming this image into an MSI image 4. The MSI image 4 thus obtained has a number of pixels equal to the number of pixels of the single-component image divided by the number of spectral bands supplied by the matrix of filters 514. Each pixel of the MSI image 4 has a number of components equal to the number of spectral bands supplied by the matrix of filters 514. In the example in FIG. 3, the MSI image 4 is therefore of size 500×500 pixels, where each pixel has six components. It is assumed here that the thumbnails 31 to 36 of the matrix of thumbnails are harmonised spatially, i.e. the thumbnails are adjusted between each other so that all the pixels situated at the same spatial position in the thumbnails 31 to 36 correspond to the same spatial position in the scene 1. In addition, it should be noted that each component of a pixel of the multispectral image 3 corresponds to the same instant in time since all the thumbnails that supplied a component were acquired by the same image sensor 517 at the same instant. In other words, the thumbnails in the matrix of thumbnails are harmonised timewise.

Each image produced by the MSI image acquisition device 51 is supplied to the processing module 52.

The thermal image acquisition device 50 is of the thermal camera type and comprises for example an uncooled infrared sensor. In one embodiment, each thermal image 3 supplied by the thermal image acquisition device 50 is of identical size to the MSI image 4. The thermal images are single-component images representing a spectral band situated in the medium infrared domain and the long-wavelength infrared. In one embodiment, the thermal images represent a spectral band situated between 3 and 5 μm or between 8 and 12 μm or between 7 and 14 μm.

Each image produced by the thermal image acquisition device 50 is supplied to the processing module 52.

The processing module 52 uses pairs of images comprising a thermal image 3 and an MSI image 4 in which the thermal 3 and MSI 4 images are harmonised spatially and temporally. If the MSI image acquisition device 51 and the thermal image acquisition device 50 do not directly generate spatially and temporally harmonised images, i.e. if there is no calibration (relative or absolute) between the MSI image acquisition device 51 and the thermal image acquisition device 50, the processing module 52 generates, from the MSI 4 and thermal 3 images supplied respectively by the MSI image acquisition device 51 and the thermal image acquisition device 50, pairs of images comprising harmonised thermal 3 and MSI 4 images.

In one embodiment, the thermal images 3 supplied by the thermal image acquisition device 50 have dimensions greater than (or respectively less than) the MSI images 4 supplied by the MSI image acquisition device 51. In this case, prior to use thereof by the processing module 50, spatial harmonisation is applied between the thermal image 3 and the MSI image 4 so as to match each pixel of the thermal image 3 with a pixel of the MSI image 4, i.e. there exists a bijective relationship between the pixels of the thermal image 3 and the pixels of the MSI image 4. To do this, each thermal image 3 is subsampled (and respectively interpolated) by the processing module 52 to the dimensions of the MSI image 4. In this way, the thermal images and the MSI images corresponding to the same instant used by the processing module 52 are harmonised spatially.

In one embodiment, when the first image frequency is lower than the second image frequency, the thermal images 3 are interpolated temporally by the processing module 52 in order to achieve the second image frequency. A temporal interpolation may for example consist of repeating an image. In this way, the thermal images 3 and the MSI images 4 are harmonised temporally.

Figure 2B:
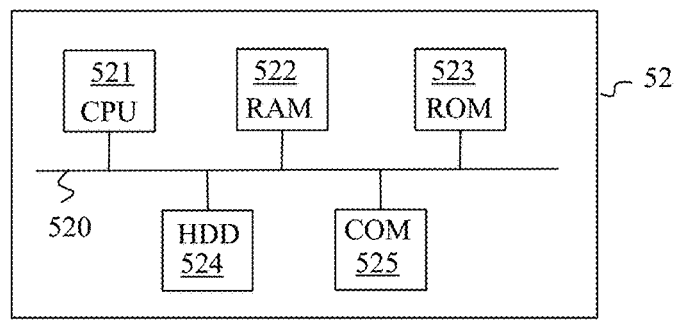
FIG. 2B illustrate s schematically an example of hardware architecture of a processing module included in a display system.

FIG. 2B illustrates schematically an example of hardware architecture of a processing module included in a display system.

According to the example of hardware architecture shown in FIG. 2B, the processing module 52 then comprises, connected by a communication bus 520: a processor or CPU (central processing unit) 521; a random access memory RAM 522; a read only memory ROM 523; a storage unit such as a hard disk or a storage medium reader such as a SD (secure digital) card reader 524; at least one communication interface 525 enabling the processing module 52 to communicate with the thermal image acquisition device 50, the MSI image acquisition device 51 and/or the image display device 53.

In an embodiment in which the thermal image acquisition device 50, the MSI image acquisition device 51, the processing module 52 and the display device 53 are separate and distant, the thermal image acquisition device 50, the MSI image acquisition device 51 and the display device 53 also comprise a communication interface able to communicate with the communication interface 525 by means of a network such as a wireless network.

The processor 521 is capable of executing instructions loaded into the RAM 522 from the ROM 523, from an external memory (not shown), from a storage medium (such as an SD card), or from a communication network. When the processing module 52 is powered up, the processor 521 is capable of reading instructions from the RAM 522 and executing them. These instructions form a computer program causing the implementation, by the processor 521, of all or part of the method described below in relation to FIGS. 4, 5 and 6.

The method described below in relation to FIGS. 4, 5 and 6 may be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 4 illustrates schematically a method for decamouflaging an object in a scene according to the invention.

One objective of the method described in relation to FIG. 4 is to supply to an operator looking at the image display device 53 an image in which pixels corresponding to the object 6 are clearly distinguished with respect to the background of the image, the background in the image being considered here to be any pixel of said image not corresponding to the object 6. In addition, the method allows to reveal contrasts internal to the object 6. To do this, said method is based on two successive implementations of a contrast accentuation procedure.

In a step 40, the processing module 52 obtains a pair of images comprising an MSI image 4 and a thermal image 3. The thermal image 3 and the MSI image 4 of said pair are harmonised spatially and temporally, i.e. each component of the multispectral image 4 and each component of the thermal image 3 are harmonised spatially and temporally with each other.

In a step 41, the processing module 52 obtains a position of a sub-part of an image, hereinafter referred to as a window. In one embodiment, the position, shape and size of the window are defined by an operator by means of a control device connected to the processing module 52.

In one embodiment, the shape and size of the window are adapted to the shape and size of the object sought 6.

In one embodiment, the operator defines a square window of one hundred pixels on each side.

For each position obtained, the processing module 52 implements steps 42, 45, 46 and 47. Optionally, the processing module 52 implements steps 43 and 44 between steps 42 and 45.

Figure 7A:
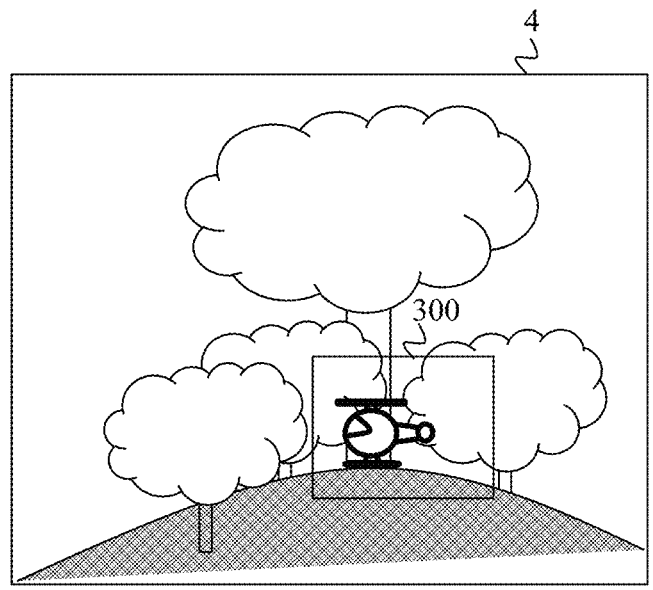
FIG. 7A illustrates schematically a step of extracting a window in an image.

During step 42, the processing module 52 extracts a window from each of the MSI 4 and thermal 3 images at said position. FIG. 7A illustrates schematically a step of extracting a window in an image. FIG. 7A takes the example of the MSI image 4 in which a window 300 comprising the object sought 6 is positioned.

Each window extracted is used subsequently by the processing module 52 in order to supply to an operator an image in which a contrast between pixels belonging to the object sought 6 and pixels not belonging to the object sought 6 is accentuated.

During step 45, the processing module 52 applies a contrast accentuation procedure to at least one of the windows extracted. The contrast accentuation procedure, when it is applied to a window, allows to obtain a window, referred to as an improved window, in which a contrast between pixels corresponding to the object and pixels not corresponding to the object is accentuated. During step 45, the contrast accentuation procedure is systematically applied to the window extracted from the MSI image 4. In one embodiment, during step 45, the contrast accentuation procedure is also applied to the window extracted from the thermal image 3.

Figure 6:
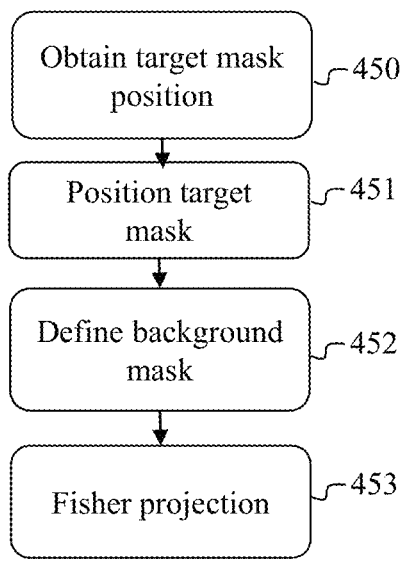
FIG. 6 illustrates schematically a contrast accentuation procedure included in the method for decamouflaging an object in a scene according to the invention.

FIG. 6 illustrates schematically a contrast accentuation procedure included in the method for decamouflaging an object in a scene according to the invention.

During a step 450, the processing module 52 obtains a position of a pixel mask suitable for containing the pixels of the window 300 corresponding to the object sought 6, referred to as the target mask T. In one embodiment, the position of the target mask T is predefined in the window 300. In another embodiment, the position of the mask T in the window 300 is defined by an operator. Knowing characteristics of the object sought 6, it is possible to adapt the shape and/or size of the target mask T to the shape and size of the object sought 6. In one embodiment, the target mask T is square and the size of the target mask T depends on the size of the object sought 6. In one embodiment, three target masks T are available to the processing module 52, a square mask of three pixels on each side, a square mask of five pixels on each side and a square mask of seven pixels on each side. The processing module 52 then chooses the smallest target mask T that can completely contain the object sought 6.

During step 451, the processing module 52 positions the target mask T at the position obtained in the window 300.

During step 452, the processing module 52 defines a pixel mask corresponding to the background in the window 300 (i.e. a pixel mask not corresponding to the object sought 6), referred to as the background mask B. In one embodiment, the background mask B is a mask complementary to the target mask T, i.e. all the pixels of the window 300 that do not belong to the target mask T belong to the background mask B.

Figure 7B:
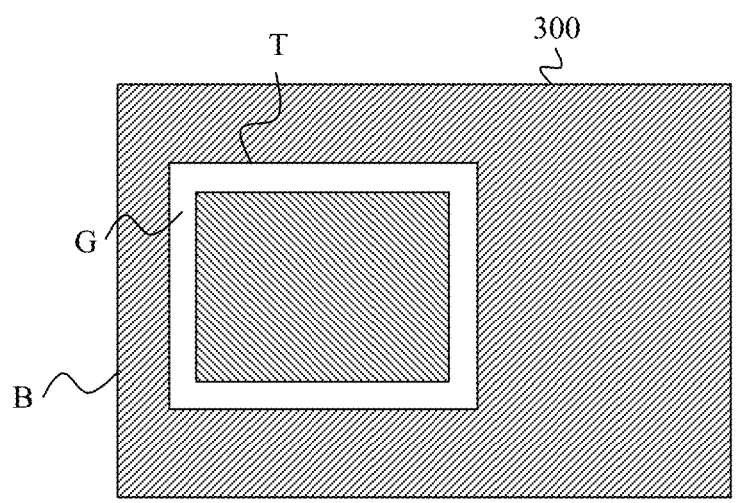
FIG. 7B illustrates schematically a step of defining masks used in the contrast accentuation procedure.

In one embodiment, a zone G corresponding to a band of a few pixels around the target mask T separates the target mask T from the background mask B. The zone G allows to avoid taking into account, during contrast accentuation, poorly defined pixels, i.e. pixels that cannot be clearly defined as belonging to the object 6 or to the background. The background mask B therefore corresponds to all the pixels of the window 300 belonging neither to the target mask T nor to the zone G. FIG. 7B illustrates schematically a step of defining target masks T and background masks B used in a contrast accentuation procedure. A rectangular target mask T is placed in the window 300. The target mask T is surrounded by a zone G. A background mask B corresponds to all the pixels of the window 300 not belonging either to the target mask T or to the zone G.

During step 453, the processing module 52 applies a Fisher projection to the pixels of the window 300. A method for applying a Fisher projection described in the article "Some practical issues in anomaly detection and exploitation of regions of *interest in hyperspectral images*" by F. Goudail et al., Applied Optics, Vol. 45, No. 21, pp. 5223-5236, is used. The method for applying a Fisher projection allows to accentuate the contrast between the pixels belonging to the target mask T and the pixels belonging to the background mask B. This method consists of projecting each pixel of the window 300 on an optimum direction of a single-dimensional or multidimensional space where each dimension of the space corresponds to a component of the window 300 to which the Fisher projection is applied. In the example of the window 300 extracted from the MSI image 4 described above, each pixel of the MSI image 4 comprises six components, each representing an intensity value in a spectral band. The space is then a multidimensional space with six dimensions. It is assumed here that the values of each component of each pixel corresponding to the mask T (or respectively to the background mask B) are random variables, spatially uncorrelated, and having a Gaussian probability density of mean $m_T$ (or respectively $m_B$) and of covariance matrix $\Gamma$. The aforementioned article mentions methods for estimating the mean $m_T$ (or respectively $m_B$) and the covariance matrix $\Gamma$.

$$u = \Gamma^{-1}(m^T - m^B)$$

The optimum projection direction, represented by a vector u, can be determined from the covariance matrix $\Gamma$ in accordance with the following formula:

$$u = \Gamma^{-1}(m^T - m^B)$$

where $m^T$ (or respectively $m^B$) is an average pixel representing pixels corresponding to the mask T (or respectively to the mask B).

$$m^T = \{m_1^T, m_2^T, \ldots, m_K^T\}$$

$$m^B = \{m_1^B, m_2^B, \ldots, m_K^B\}$$

where $m_k^T$ (or respectively $m_k^B$, with $k \in [1; K]$, is a value of a component of the average pixel $m^T$ (or respectively $m^B$) in a spectral band k, and K is the number of components of a pixel (here K=6 for the window extracted from the MSI image 4).

$$m_k^T = \frac{1}{N_k^T} \sum_{i \in T} p_k^T(i)$$

$$m_k^B = \frac{1}{N_k^B} \sum_{i \in B} p_k^B(i)$$

where $p_k^T(i)$ (respectively $p_k^B(i)$) is a value of a $k^{th}$ component of an $i^{th}$ pixel $p^T(i)$ corresponding to the target mask T (or respectively to the background mask B), and $N_k^T$ is a number of pixels corresponding to the target mask T (or respectively to the background mask B).

The projection on the vector u is the Fisher projection and amounts to seeking a maximum correlation between variations in component values.

Each pixel p(i) of the window 300 is projected according to the Fisher projection:

$$f(i) = u^t \cdot p(i)$$

where $u^t$ is the transpose of the vector u, f(i) is a pixel of an improved window (also referred to as the Fisher projection window F), corresponding to a result of an application of the Fisher projection on the window 300. The improved window is a single-component window with shape and size identical to the window 300.

We have considered up to now that all the spectral bands in the plurality of spectral bands were taken into account for the Fisher projection. In one embodiment, the Fisher projection takes into account, for each pixel, only a subset of the components of said pixel, i.e. a subset of spectral bands in the plurality of spectral bands. For example, the Fisher projection could take into account only the two or three spectral bands in which the contrast between the pixels of the target mask T and the pixels of the background mask B is the highest. The contrast in a spectral band can be defined as follows:

$$C_k = \frac{(m_k^T - m_k^B)^2}{(\sigma_k^B)^2}$$

where $\sigma_k^B$ is a standard deviation of the values of components corresponding to the spectral band k of the pixels corresponding to the mask B. The Fisher projection then takes into account the two or three spectral bands associated with the highest contrast values $C_k$.

Returning to FIG. 4, during step 46, the processing module 52 forms a multicomponent window. Each improved window obtained by implementing the contrast accentuation procedure and each extracted window to which the contrast accentuation procedure has not been applied supplies at least one component of the multicomponent window. For example, when the contrast accentuation procedure was applied only to the window extracted from the MSI image 4, the multicomponent window comprises a component corresponding to the improved window obtained by the contrast accentuation procedure and a component corresponding to the window extracted from the thermal image 4. In one embodiment, prior to the formation of the multicomponent window, the processing module 52 scales the values of components of each pixel of each improved window obtained by implementing the contrast accentuation procedure and of each extracted window to which the contrast accentuation procedure has not been applied. An objective of this scaling is that all the windows used for creating the multicomponent window have values of components of pixels distributed over the same range of values. For example, a scaling is applied to the component value of each pixel of the improved window obtained when the contrast accentuation procedure is applied to the window extracted from the MSI image 4 (or respectively to the component value of each pixel of the window extracted from the thermal image 3) so that the component value of each pixel of the improved window (or respectively of the window extracted from the thermal image 3) is distributed in a predefined range of values [MIN; MAX]. In one embodiment, MIN=0 and MAX=255.

During step 47, the processing module 52 applies the contrast accentuation procedure described in relation to FIGS. 6 and 7B to the multicomponent window thus formed.

In a step 48, the processing module 52 generates a restitution image intended to be displayed by the image display device 53. To do this, the processing module 52 inserts each improved window obtained by applying the contrast accentuation procedure to each multicomponent window formed in a receiving image representing the scene. Hereinafter restitution window means an improved window obtained by applying the contrast accentuation procedure to a multicomponent window.

To do this, for each restitution window, the processing module 52 recovers the position of the window 300 obtained during step 41 and positions the restitution window in a receiving image representing the scene 1 at said position. The processing module 52 therefore generates a restitution image in which the values of the pixels situated in a restitution window are the values of pixels issuing from the Fisher projection applied to the corresponding multicomponent window and the values of the pixels situated outside the restitution window are the values of the pixels of the receiving image.

In one embodiment, the receiving image is a thumbnail in the matrix of thumbnails.

In one embodiment, the processing module 52 reconstructs a receiving image from a subset of spectral bands in the plurality of spectral bands. For example, the processing module 52 uses three spectral bands situated in the visible domain corresponding to the three primary colours red, green and blue and creates a receiving image representing what a human visual system would see of the scene 1.

The restitution image is next displayed to an operator by means of the display device 53.

In one embodiment, referred to as automatic mode, it is not an operator who defines the position of the window 300 and the position of the target mask T. A plurality of positions of the window 300 are tested successively by the processing module 52. For example, the window 300 is moved in the MSI image 4 (or respectively in the thermal image 3) so that each pixel of the MSI image 4 appears at least once in the window 300. For each position of the window 300 tested, the processing module 52 implements steps 42, 45, 46 and 47. In this embodiment, during step 451, the target mask T is defined automatically so that it is positioned at the centre of the window 300. Following implementations of steps 42, 45, 46 and 47, the processing module 52 selects at least one of the restitution windows obtained and applies step 48 to each restitution window selected. For example, the processing module 52 selects the restitution window displaying the highest contrast between the pixels corresponding to the target mask T and the pixels corresponding to the background mask B. In this case, it is considered that the restitution window displaying the highest contrast between the pixels corresponding to the target mask T and the pixels corresponding to the background mask B allows to obtain a good restitution image.

In an embodiment that can be combined with the automatic mode between steps 42 and 45, the processing module 52 implements steps 43 and 44. Step 43, which we describe in more detail in relation to FIG. 5, allows to test whether an object present in a window 300 is stealthy in relation to the human visual system. An object is non-stealthy in relation to the human visual system if it appears clearly in at least one spectral band situated in the visible domain. It is not necessary to attempt to improve the display of an object if this object is non-stealthy, that is to say clearly visible and identifiable in a scene. When, during step 43, an object is considered to be non-stealthy by the processing module 52, the processing module 52 implements step 44, during which it ends the implementation of the method for decamouflaging an object for the position of the window 300 obtained during step 41. Otherwise, if the object is considered to be stealthy by the processing module 52, the processing module 52 continues the implementation of the method for decamouflaging an object with the step 45 already explained.

In this embodiment, we shall consider that the plurality of spectral bands comprises three spectral bands situated in the visible domain and corresponding to the three primary colours red, green and blue. The MSI image acquisition device 51 is therefore able to supply spectral bands that a CDM sensor would supply. The MSI image acquisition device 51 therefore behaves as equipment comprising an image acquisition device able to supply CDM images and an image acquisition device able to acquire spectral bands situated in the near infrared and/or the short-wavelength infrared. In one embodiment, the MSI image acquisition device 51 is replaced by equipment comprising an image acquisition device able to supply CDM images and an image acquisition device able to acquire spectral bands situated in the near infrared and/or the short-wavelength in infrared.

Figure 5:
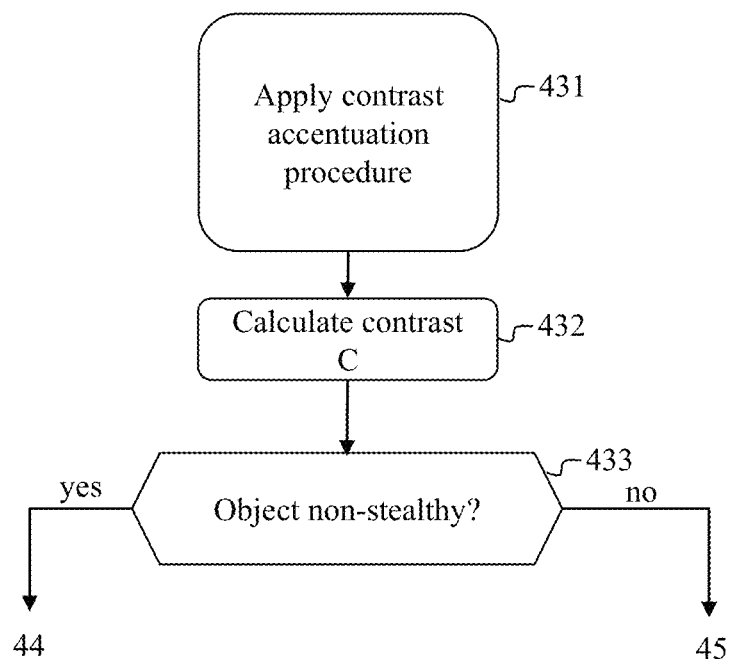
FIG. 5 illustrates schematically a procedure for checking stealth included in the method for decamouflaging an object in a scene according to the invention.

FIG. 5 illustrates schematically a stealth checking procedure included in the method for decamouflaging an object in a scene according to the invention corresponding to the optional step 43.

In a step 431, the processing module 52 applies the contrast accentuation procedure described in relation to FIG. 6 to the window 300 extracted from the MSI image 4 taking into account at least one of the three components corresponding to spectral bands situated in the visible domain, that is to say at least one of the spectral bands corresponding to the three primary colours red, green and blue.

In a step 432, the processing module 52 calculates a contrast value C between the pixels corresponding to the mask T and the pixels corresponding to the mask B of the improved window obtained following the implementation of the contrast accentuation procedure during step 431.

$$C = \frac{(m^T - m^B)^2}{(\sigma^B)^2}$$

where $m^T$ (and respectively $m^B$) is a mean value of the pixels corresponding to the mask T and respectively B), and $\sigma^B$ is a standard deviation of the pixels corresponding to the mask B.

In a step 433, the processing module 52 determines whether the window 300 extracted from the MSI image 4 comprises a non-stealthy object. To do this, the processing module 52 compares the contrast value C with a predefined threshold contrast value $C_s$ (for example $C_s$=2.3). When C>$C_s$, the processing module 52 considers that the window 300 comprises a non-stealthy object. In this case, step 433 is followed by step 44. When C≤$C_s$, the processing module 52 considers that the window 300 does not comprise a non-stealthy object. In this case, step 433 is followed by step 45.

In one embodiment, the thermal image 3 is a multicomponent image. For example, the thermal image 3 comprises a component situated in the medium-wavelength infrared (MWIR) and a component situated in the long-wavelength infrared (LWIR). In this embodiment, the stealth checking procedure corresponds to the optional step 43 described in relation to FIG. 5 is carried out on the window extracted from the thermal image 3 during step 42.

In this case, during step 431, the processing module 52 applies the contrast accentuation procedure described in relation to FIG. 6 to the window extracted from the thermal image 3 taking into account each of the components of the thermal image 3.

During step 432, the processing module 52 calculates a contrast value C between the pixels corresponding to the mask T and the pixels corresponding to the mask B of the improved window obtained following the implementation of the contrast accentuation procedure during step 431.

In step 433, the processing module 52 determines whether the window extracted from the thermal image 3 comprises a non-stealthy object. To do this, the processing module 52 compares the contrast value C with the predefined threshold contrast value $C_s$. When C>$C_s$ the processing module 52 considers that the window extracted from the thermal image 3 comprises a non-stealthy object. In this case, step 433 is followed by step 44. When C≤$C_s$, the processing module 52 considers that the window extracted from the thermal image 3 does not comprise a non-stealthy object. In this case, step 433 is followed by step 45.

It should be noted that the two embodiments in FIG. 5 can be combined so that a checking of the stealth of an object is done on at least one of the spectral bands corresponding to the three primary colours red, green and blue and/or on the components of the thermal image 3.

In another embodiment of step 43, the processing module 52 defines a mask T and a mask B directly in each of the components of the MSI image 4 and each of the components of the thermal image 3 and then calculates a contrast value C between the pixels corresponding to the mask T and the pixels corresponding to the mask B independently for each of the components of the MSI image 4 and each of the components of the thermal image 3. If, for at least one of said components, C>$C_s$, step 43 is followed by step 44. Otherwise step 43 is followed by step 45.

We saw above that, in one embodiment, the contrast accentuation procedure is applied to the window extracted from the thermal image 3. In this case it is preferable, in order to better reveal the details of the object sought 6, not to use a mask T adapted to the size and shape of the object sought 6, but rather a mask T having a shape and size adapted to the shape and size of the details having an interest for identifying the object sought 6. In one embodiment, the mask T used in the contrast accentuation procedure described in relation to FIG. 6 has a shape and size adapted to the shape and size of the details having an interest in identifying the object sought 6. During steps 45 and 47, said contrast accentuation procedure is implemented for a plurality of positions of the mask T in the window 300 to which the procedure is applied. The plurality of positions allows to cover entirely the shape and size of the object 6.

During step 45, a plurality of improved windows is then obtained for the window extracted from the MSI image 4 (and respectively for the window extracted from the thermal image 3). The improved windows of the plurality of improved windows obtained for the window extracted from the MSI image 4 are combined to form a single improved window for the window extracted from the MSI image 4. The improved windows of the plurality of improved windows obtained for the window extracted from the thermal image are combined to form a single improved window for the window extracted from the thermal image 3. The two improved windows thus obtained are then used during step 46 to form the multicomponent window.

During step 47, a plurality of improved windows is obtained for the multicomponent window. The improved windows of the plurality of improved windows obtained for the multicomponent window are combined to form a single improved window for the multicomponent window. The single improved window thus obtained is used during step 48 to generate the restitution image.

The invention claimed is:

1. A method for decamouflaging an object in a scene observed by a plurality of devices comprising a device for acquiring images, referred to as multispectral images, comprising a plurality of components, each representing a spectral band lying in at least one domain among a visible domain, a near infrared domain and a short-wavelength infrared domain, and a device for acquiring images, referred to as thermal images, comprising at least one component representing a spectral band lying in at least one domain among a medium infrared domain and a long-wavelength infrared domain, wherein the method comprises:
   obtaining a multispectral image and a thermal image, each component of the multispectral image and each component of the thermal image being harmonised spatially and temporally with each other;
   obtaining at least one current position of a subpart of an image, referred to as a window, and, for said current position obtained:
      extracting a window from each of the multispectral and thermal images at said current position;
      applying a contrast accentuation procedure to at least one of the extracted windows comprising a window extracted from the multispectral image, said contrast accentuation procedure, when it is applied to a window, allowing a window to be obtained, referred to as an improved window, in which a contrast between pixels corresponding to the object and pixels not corresponding to the object is accentuated;
      forming a multicomponent window, whereby the multicomponent window comprises each improved window obtained and each extracted window to which said contrast accentuation procedure has not been applied; and
      applying said contrast accentuation procedure to the multicomponent window;
   generating an image, referred to as a restitution image, by inserting each improved window obtained by applying said contrast accentuation procedure to each multicomponent window formed in a receiving image representing the scene.

2. The method according to claim 1, wherein the contrast accentuation procedure comprises, when it is applied to a window:
   obtaining at least one position of a first mask suitable for containing pixels corresponding to said object in said window and, for each position:
      positioning said mask at said position in said window;
      defining a second mask comprising pixels of said window not included in the first mask, and
      applying a Fisher projection to the pixels of said window in order to obtain an improved window in which contrast between the pixels of the first and second mask is accentuated.

3. The method according to claim 2, wherein the first mask is suitable for each pixel of the object to be contained in said first mask.

4. The method according to claim 2, wherein the first mask is suitable for containing each pixel of a detail of said object having an interest for identifying said object.

5. The method according to claim 4, wherein the method further comprises, for the window extracted from the multispectral image and the window extracted from the thermal image:
   applying the contrast accentuation procedure for a plurality of positions of the first mask in each of said windows, the plurality of positions allowing the object to be covered entirely;
   forming a first unique improved window from each improved window obtained during each application of the contrast accentuation procedure to the window extracted from the multispectral image and a second unique improved window from each improved window obtained during each application of the contrast accentuation procedure to the window extracted from the thermal image; and
   forming the multicomponent window from the first and second unique improved windows.

6. The method according to claim 5, wherein the method comprises, for the multicomponent window formed:
   applying the contrast accentuation procedure for a plurality of positions of the first mask in the multicomponent window, the plurality of positions allowing the object to be covered entirely;
   forming a third unique improved window from each improved window obtained during each application of the contrast accentuation procedure to the multicomponent window;
   using the third unique improved window for generating the restitution image.

7. The method according to claim 2, wherein the plurality of components of the multispectral image comprises at least one spectral band included in the visible domain corresponding to at least one primary colour among a red primary colour, a blue primary colour and a green primary colour and in that, for each position of said window obtained, the method comprises:
   applying the contrast accentuation procedure to the window extracted from the multispectral image, each component corresponding to a spectral band situated in the near infrared and/or short-wavelength infrared not being taken into account;
   calculating a contrast value, referred to as the visible contrast value, between the pixels corresponding to the first mask and the pixels corresponding to the second mask of the improved window obtained following the application of the contrast accentuation procedure; and
   ending the implementation of the method for decamouflaging an object for the position of said window obtained when said visible contrast value is above a predefined threshold, referred to as the visible threshold.

8. The method according to claim 2, wherein the thermal image comprises at least two components and in that, for each position of said window obtained, the method comprises:

applying the contrast accentuation procedure to the window extracted from the thermal image;

calculating a contrast value, referred to as the thermal contrast value, between the pixels corresponding to the first mask and the pixels corresponding to the second mask of the improved window obtained following the application of the contrast accentuation procedure to the window extracted from the thermal image; and ending the implementation of the method for decamouflaging an object for the position of said window obtained when the thermal contrast value is above a predefined threshold, referred to as the thermal threshold.

9. The method according to claim 1, wherein the multispectral images represent spectral bands situated in a spectral band ranging from 0.4 to 1 µm or 0.6 to 1 µm or 0.9 to 2.5 µm and the thermal images represent a spectral band situated between 3 and 5 µm or between 8 and 12 µm.

10. A device for decamouflaging an object in a scene observed by a plurality of devices comprising a device for acquiring images, referred to as multispectral images, comprising a plurality of components, each representing a spectral band lying in at least one domain among a visible domain, a near infrared domain and a short-wavelength infrared domain, and a device for acquiring images, referred to as thermal images, comprising at least one component representing a spectral band lying in at least one domain among a medium infrared domain and a long-wavelength infrared domain, wherein the device for decamouflaging comprises circuitry adapted for:

obtaining a multispectral image and a thermal image, each component of the multispectral image and each component of the thermal image being harmonised spatially and temporally with each other;

obtaining at least one current position of a subpart of an image, referred to as a window, and, for said current position obtained:

extracting a window from each of the multispectral and thermal images at said current position;

applying a contrast accentuation procedure to at least one of the extracted windows comprising a window extracted from the multispectral image, said contrast accentuation procedure, when it is applied to a window, allowing a window to be obtained, referred to as an improved window, in which a contrast between pixels corresponding to the object and pixels not corresponding to the object is accentuated;

forming a multicomponent window, whereby the multicomponent window comprises each improved window obtained and each extracted window to which said contrast accentuation procedure has not been applied; and applying said contrast accentuation procedure to the multicomponent window;

and, generating an image by inserting each improved window obtained by applying said contrast accentuation procedure to each multicomponent window formed in a receiving image representing the scene.

11. A computer program product, embodied in a non-transitory computer readable medium and comprising instructions for implementation, by a programmable device, of a method for decamouflaging an object in a scene observed by a plurality of devices comprising a device for acquiring images, referred to as multispectral images, comprising a plurality of components, each representing a spectral band lying in at least one domain among a visible domain, a near infrared domain and a short-wavelength infrared domain, and a device for acquiring images, referred to as thermal images, comprising at least one component representing a spectral band lying in at least one domain among the medium infrared domain and the long-wavelength infrared domain, when said computer program product is executed by a processor of said programmable device, wherein the method for decamouflaging comprises:

obtaining a multispectral image and a thermal image, each component of the multispectral image and each component of the thermal image being harmonised spatially and temporally with each other;

obtaining at least one current position of a subpart of an image, referred to as a window, and, for said current position obtained:

extracting a window from each of the multispectral and thermal images at said current position;

applying a contrast accentuation procedure to at least one of the extracted windows comprising a window extracted from the multispectral image, said contrast accentuation procedure, when it is applied to a window, allowing a window to be obtained, referred to as an improved window, in which a contrast between pixels corresponding to the object and pixels not corresponding to the object is accentuated;

forming a multicomponent window, whereby the multicomponent window comprises each improved window obtained and each extracted window to which said contrast accentuation procedure has not been applied; and applying said contrast accentuation procedure to the multicomponent window;

generating an image, referred to as a restitution image, by inserting each improved window obtained by applying said contrast accentuation procedure to each multicomponent window formed in a receiving image representing the scene.

12. A non-transitory information storage medium, storing a computer program comprising program code instructions which can be loaded in a programmable device to cause said programmable device to carry out a method for decamouflaging an object in a scene observed by a plurality of devices comprising a device for acquiring images, referred to as multispectral images, comprising a plurality of components, each representing a spectral band lying in at least one domain among a visible domain, a near infrared domain and a short-wavelength infrared domain, and a device for acquiring images, referred to as thermal images, comprising at least one component representing a spectral band lying in at least one domain among the medium infrared domain and the long-wavelength infrared domain, when said program is executed by a processor of said programmable device, wherein the method for decamouflaging comprises:

obtaining a multispectral image and a thermal image, each component of the multispectral image and each component of the thermal image being harmonised spatially and temporally with each other;

obtaining at least one current position of a subpart of an image, referred to as a window, and, for said current position obtained:

extracting a window from each of the multispectral and thermal images at said current position;

applying a contrast accentuation procedure to at least one of the extracted windows comprising a window extracted from the multispectral image, said contrast accentuation procedure, when it is applied to a window, allowing a window to be obtained, referred to as an improved window, in which a contrast between pixels corresponding to the object and pixels not corresponding to the object is accentuated;

forming a multicomponent window, whereby the multicomponent window comprises each improved window obtained and each extracted window to which said contrast accentuation procedure has not been applied; and applying said contrast accentuation procedure to the multicomponent window;

generating an image, referred to as a restitution image, by inserting each improved window obtained by applying said contrast accentuation procedure to each multicomponent window formed in a receiving image representing the scene.

* * * * *